May 3, 1960 G. L. NAUS 2,935,120
SEAT AND BACKREST FOR A LOCOMOTIVE SEAT
Filed July 5, 1956 2 Sheets-Sheet 1
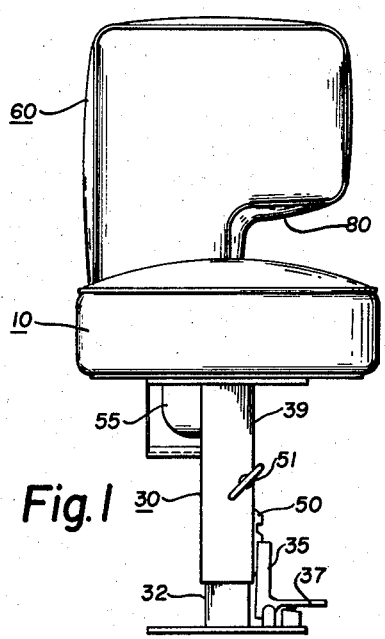
INVENTOR.
GLEN L. NAUS
BY
*Eber J. Hyde*
ATTORNEY

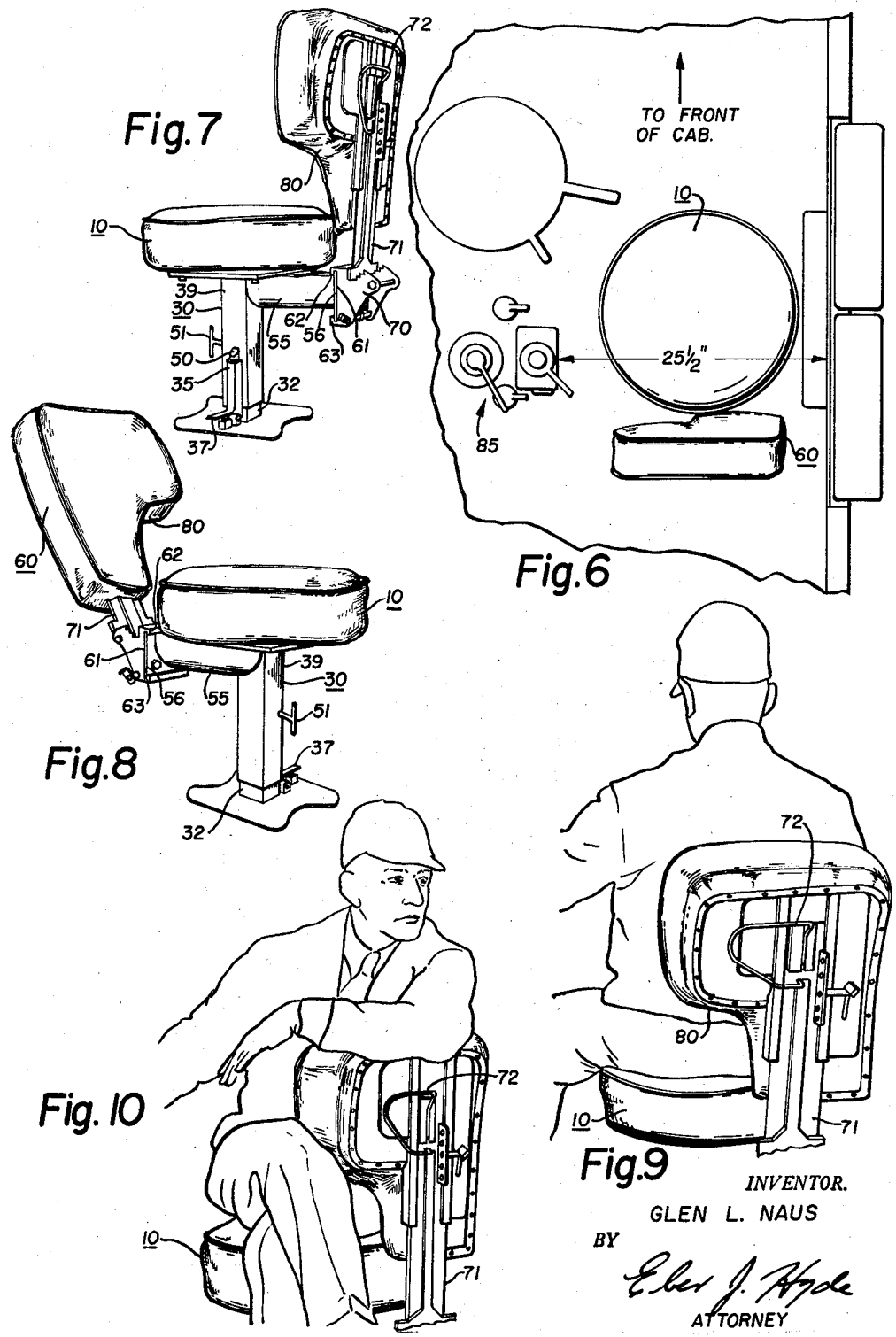

United States Patent Office 2,935,120
Patented May 3, 1960

2,935,120

SEAT AND BACKREST FOR A LOCOMOTIVE SEAT

Glen L. Naus, Willard, Ohio

Application July 5, 1956, Serial No. 596,060

3 Claims. (Cl. 155—94)

This invention is a continuation-in-part of my application Serial No. 318,480, filed November 3, 1952 for an Adjustable Rest for a Locomotive Seat, now Patent Number 2,772,724.

The present invention is directed to the combination of the adjustable backrest of the previous application and a rotatable seat installed, or to be installed, in the cab of a locomotive in such a manner that the user of seat is comfortably and safely supported for all of the normal operating positions, and in the event of an emergency, can quickly leave his exposed location for a safer part of the cab.

An object of the invention is the provision of a safe, comfortable seat for the operator of a locomotive whose controls are so arranged that the operator's position is crowded between the side of the cab on one side and controls to the front and the opposite side.

This condition prevails in the engineer's seat in yard switch engines, particularly of the diesel type.

In the past the engineer has sat on a square cornered seat, and his backrest has been an arm rest turned approximately 90 degrees to provide a small backrest which supported the engineer low down in the kidney region, and which failed to support his upper back and shoulders. Since switch engines of necessity undergo considerable starting, stopping and jolting, the fatigue on the engineer is very high, especially so since his entire upper body has been completely unsupported. Furthermore, when an unusually hard jolt occurred accidents happened; the engineer could be thrown completely off of his seat. The previous "backrest" also did not provide for a quick exit of the engineer in the event of an imminent collision.

It is, therefore, another object of my invention to provide a seat and backrest for the engineer of a switching type diesel locomotive which adequately supports his upper back region while he is in normal forward position, and which supports his side, arm and thigh when he is looking to the rearward, which is as natural and common a position as the forward position for a switcher; and to provide in this seat and backrest provision for quickly swinging the backrest out of the way for a quick exit.

Other objects and a fuller understanding of my invention may be had by referring to the following specification and claims.

With reference to the drawings, there is shown in Figure 1 a front view of the seat and backrest of the invention.

Figure 2 is a top view, to an enlarged scale, of the frame on which the padded seat is supported.

Figure 3 is a bottom view on the same scale as Figure 1, looking up underneath the seat of Figure 1.

Figure 4 is a sectional view taken along line 4—4 of Figure 3, but on a slightly enlarged scale.

Figure 5 is a sectional view taken along line 5—5 of Figure 2, showing the supporting column for the seat.

Figure 6 is a "bird's eye" view of the interior of a switcher locomotive showing the location of various controls, and the dimensional indications show the space provided for a seat.

Figure 7 is a isometric, rear, quarter view of the seat and backrest.

Figure 8 is a front, quarter view of the seat showing the backrest in its "exit" position.

Figure 9 is a rear view showing the seat as occupied by an engineer looking forward, and Figure 10 is a rear, quarter view of the seat as occupied by an engineer looking rearwardly.

With reference to the first sheet of drawing, there is shown in Figure 1 the seat, backrest and support for the same which form the combination of this invention. The seat portion 10 is preferably covered with leather or heavy duty plastic material 11 filled with packing material 12 as is known to the art, and the covering material 11 is secured to the underneath surface of a heavy board 13 by suitable means 14, as shown in Figures 3 and 4.

Secured to the central portion of the heavy board 13 is a smaller board 16, and a metal plate 17 is connected to the board 16. Screws 18 may be used to secure the two boards 13, 16 and the metal plate 17 together. The metal plate 17 extends beyond the edges of the board 16 and includes a strong downwardly extending central pivot member 20. An annular flange member 21 is secured between the outer edges of the metal plate 17 and the board 13, and includes a downwardly extending collar 22 which, as shown in Figure 3, preferably is square, and four bolt holes 23 are provided in the four corners thereof where they do not interfere with the round metal plate 17 whose underneath surface forms a bearing area on which the seat shown in Figure 3 can rotate.

The seat portion 10 (Fig. 3) is mounted on a support 30 shown in its entirety in Figure 5; Figure 4 showing the cooperation of the underneath surface of the seat 10 with the top surface of the support 30.

The support 30 comprises a base plate 31 which may be bolted or otherwise firmly affixed to the floor of the engine, and extending upwardly from the plate 31 is a lower hollow tube 32 which preferably is welded to the base plate 31 along the joint 33. A pair of spaced apart lugs 34 are secured to the base plate 31 and a dog 35 is pivotably connected thereto by pivot member 36. The dog 35 includes an outwardly extending foot pedal 37 which is upwardly biased by spring 38 suitably mounted between the base plate 31 and the pedal 37 to bias the tooth 29 of the dog 35 toward the tube 32.

An upper hollow tube 39 fits over and around the tube 32, and a compression spring 40 is mounted therebetween biasing the upper tube 39 away from the base plate 31. A circular metal bearing plate 41 is welded or otherwise affixed to the upper end of the upper tube 39, and a hole 42 is provided extending through the bearing plate 41 into the hollow interior thereof. The upper bearing surface of the bearing plate 41 has secured to it one or more bearing rings 43, 44, upon which the underneath surface of the bearing plate 17 of the seat assembly rests, as shown in Figure 4.

While the bearing rings 43, 44 have been shown secured to the bearing plate 41 it is of course feasible to secure them to the underneath surface of the metal bearing plate 17 which forms part of the seat assembly (Fig. 3), and it is also possible to have the rings 43, 44 free floating between the bearing plates 17 and 41, in which event localized stops or guides can be provided to maintain the rings relatively concentric with respect to the seat 10 and with respect to the support 30. The bearing plate 41 is square, similar to the annular flange member 21, but it is slightly smaller so that it fits within the downwardly turned flange 22 so that the slot between the plates 17 and 41 is covered. Grease may of course be applied in that slot to lubricate the bearing rings 43, 44. Holes 47 extend through the corners of the bearing plate 41, and bolts 48 extend therethrough and through the holes 23 in the flange member 21, thereby securing the seat portion 10 to the support portion 30. Relative rotation of the seat 10 with respect to the support 30 takes place across the bearing rings 43, 44. Held stationary are the tube 39, the bearing plate 41, the rings 43, 44 (if they are connected to the plate 41), the bolts 48, and the flange member 21. The rotating parts are the seat 10, the board 13, the board 16 and the plate 17. Since the weight of the person sitting on the seat tends to push the plate 17 downwardly with respect to the inwardly turned portion of the flange member 21 there is very little frictional resistance at the overlapping areas thereof.

The outer tube 39 has secured to it a plurality of height adjusting teeth 50 which mesh with the tooth 29 on the dog 35 for adjusting the height of the seat and its backrest, the spring 40 forcing the seat portion up when the tooth 29 is withdrawn. A hole is drilled through tube 39 and a threaded lock device 51 is provided therein for holding the two nested tubes in fixed relation when a comfortable height is obtained. To adjust the height of the seat the person occupying it merely depresses the lever 37 with his foot and, while sitting on the seat with his other foot on the floor, puts more or less of his weight on the seat until the desired height is obtained. He then takes his foot off of the lever, and subsequently locks the threaded device 51.

A horizontal tubular member 55 is welded to the outside tubular member 39, and terminates in a flat plate 56 onto which the backrest 60 is connected. As shown in Figure 8 the backrest 60 has a support device (described in detail in Serial No. 318,480, now Patent No. 2,772,724) which terminates in a plate 61 having a top hook 62 and a bottom hook 63. The backrest is slid horizontally into place on the plate 56 with the top and bottom hooks over and under the top and bottom edges of the plate 56 where they are then bolted in place to keep them from sliding apart.

The adjustable features of the backrest and the emergency escape device which permits the backrest to quickly be thrown into the tilt-back position shown in Figure 8 are described in detail in applicant's previous application Serial No. 318,480, now Patent 2,772,724.

Briefly, a stepped pair of spaced apart side plates 70 are firmly connected to the end plate 61, and a tilting plate 71 is adjustably positioned between the stepped plates 70. By pulling up on the lever 72 the fixed relation is released and the back portion 73 falls backwardly.

An important feature of the invention is that both the seat 10 and the back 60 can be raised and lowered as a unit, but only the seat is rotatable, the back being fixed with respect to the support 30. This is important for a switcher engineer because, as shown in Figure 10, when he turns the seat around to back the engine, his left arm rests on top of the backrest in a comfortable supporting position, and his right hand is free to manipulate the controls shown in Figure 6.

With the old type square cornered seat, the operator's knees would be squeezed between the seat and his controls as he turned. With the new round seat which rotates, his knees clear the controls even though very little room is provided for the seat and the operator. Further, as can be seen from Figure 6, with a seat and an upright, fixed, backrest located between the window and the controls there is no room for the engineer to quickly escape from his forward position. With the backrest quickly tilted out of the way by pulling up on the lever 72, the engineer can readily escape in an emergency.

A further, very important feature of the invention is the cut-away portion 80 of the backrest. This cut-away area 80, as shown in Figure 10, provides room for the engineer's thigh when he is operating the engine in the reverse direction. Without this space his position is cramped, and furthermore he could not readily escape in an emergency. As shown in Figure 10, the engineer's right hand is in a comfortable position on the control group 85. His left hand is comfortably supported near the lever 72 which permits the backrest to fall backwards, his legs are in a natural, comfortable, supported position, and his body is fully supported against jolts. A comfortable supported position corresponding to this reverse position was impossible with the old seat arrangement.

Still another feature of the invention lies in the structure whereby the vertical center-line of the backrest is offset to one side of the vertical center-line of the floor support 30. This is due to the angular relationship of the horizontal support 55, and results in the backrest 60, as shown in Figure 1, to be to the left of the seat, providing added clearance between the backrest and the controls as shown in Figure 6.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A seat and backrest for a locomotive, comprising a support fixed with respect to and adjacent a sidewall of the cab of the locomotive, a seat rotatably connected to the support, and a backrest non-rotatably connected to said support and adapted to substantially fully support a man's back when the locomotive is being driven in a forward direction, said backrest being cut away in a location at its lower edge and only on the side opposite said sidewall of the locomotive to accommodate the engineer's thigh when he has turned around with the seat toward the center of the locomotive and is driving the locomotive backwards.

2. A seat and backrest as set forth in claim 1, further characterized by means securing said backrest portion to said support for tilting motion with respect thereto and with respect to said seat portion independent of the relative rotary relationship between the seat and the back.

3. A seat and backrest as set forth in claim 1, further characterized by said support including height adjusting means which, upon adjustment, simultaneously adjusts the height of the rotatable seat and the non-rotatable backrest independent of the relative rotary relationship between the seat and the back.

References Cited in the file of this patent

UNITED STATES PATENTS

| | | |
|---|---|---|
| 454,100 | Wilson | June 16, 1891 |
| 657,875 | Johnson | Sept. 11, 1900 |
| 686,279 | Florey | Nov. 12, 1901 |
| 2,310,346 | Bell | Feb. 9, 1943 |
| 2,364,050 | Benson | Dec. 5, 1944 |
| 2,393,242 | Flogaus | Jan. 22, 1946 |
| 2,528,949 | Engstrom | Nov. 7, 1950 |
| 2,529,780 | Miller | Nov. 14, 1950 |
| 2,689,599 | Mauser | Sept. 21, 1954 |
| 2,702,584 | Williams et al. | Feb. 22, 1955 |